June 18, 1929.  E. C. WEISGERBER  1,717,640

PIVOTAL JOINT FOR PIPE

Filed Sept. 14, 1925

INVENTOR
EDWIN C. WEISGERBER
BY
ATTORNEY

Patented June 18, 1929.

1,717,640

UNITED STATES PATENT OFFICE.

EDWIN C. WEISGERBER, OF LOS ANGELES, CALIFORNIA.

PIVOTAL JOINT FOR PIPE.

Application filed September 14, 1925. Serial No. 56,249.

As may be inferred from the above designation, this invention relates particularly to fluid-tight but flexible joints for pipe, such as a pipe for the delivery of oil from a tank into alternative or successive receptacles, or a pipe intended to be swung in a substantially vertical plane to vary the level from or to which a liquid is withdrawn, to control the outflow of a fluid from any receptacular element, or from one element of a refinery installation into another element thereof.

It is an object of this invention to provide a simple and rugged joint construction suitable for use in connecting any two tubular elements which meet at an angle such as an angle of 90°, more or less, said construction permitting relative rotation therebetween, and permitting also a take-up in compensation for wear and also a ready renewal of wearing parts.

It is the further object of my invention to provide what may be termed a swing or swivel joint between pipes which shall comprise relatively few and simple parts, and which shall nevertheless provide ample bearing surfaces, between which gaskets may be inserted; and an advantageous embodiment of my invention may comprise an angle- or elbow-casting of special construction, an inwardly extending flange surrounding one opening of this casting being adapted to engage a collar or seat lip on one of the mentioned pipes; and within this casting I may employ a removable bearing plate or annular seat threaded in said casting and adapted also to engage said first mentioned collar or seat lip, said last mentioned bearing plate or annulus being preferably provided not only with means favorable to its engagement by a special wrench, but with means for locking it in any adjusting position.

It is the further object of my invention to provide an organization of the general character described in which the axes of the mentioned pipes or tubular elements, hereinafter referred to respectively as an inlet pipe and an outlet pipe, may intersect at various angles, and it is an important feature of my invention that, regardless of the angle between said pipes or tubular elements, the interior of the mentioned casting by which the same are pivotally connected is sufficiently spacious, and a plugged opening thereto is of sufficient breadth, to permit the insertion or removal of the mentioned threaded bearing plate or annulus therethrough. The mentioned plugged opening may moreover be used as a clean-out opening or for the attachment of an additional pipe, or for the temporary or permanent attachment of a test cock, a pressure gauge, or the like.

Other objects of my invention may be best understood from the following description of an illustrative embodiment thereof, taken in connection with the appended claims and the accompanying drawings, in which Fig. 1 is a perspective view illustrating the use of my invention in connecting a vertical pipe with a horizontal pipe in such manner as to permit the latter to be swung opposite any one of a plurality of receiving funnels disposed in an arc about the axis of said vertical pipe.

Figure 1:
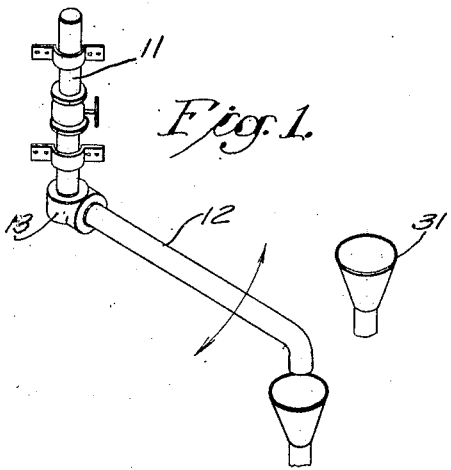
Figure 2:
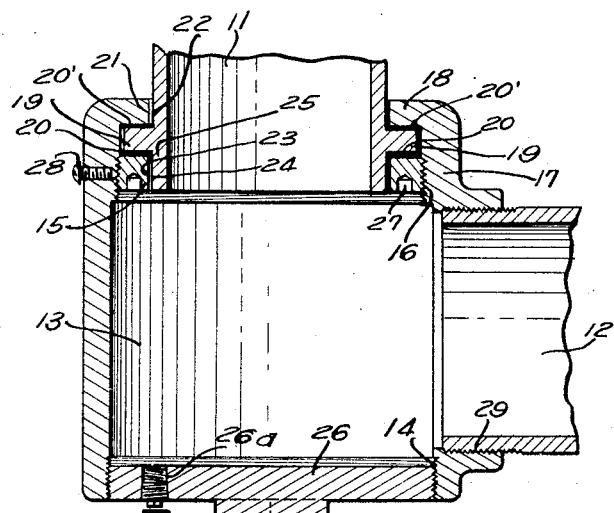
Fig. 2 is a vertical section through an embodiment of my invention in which two pipes are shown as pivotally joined at an angle of substantially 90°.

Referring to the details of that specific embodiment of my invention illustrated in Figs. 1 and 2, 11 being arbitrarily regarded as an inlet pipe and 12 as an outlet pipe, 13 is a special angle casting or fitting constructed in accordance with the principles of my invention and provided with a comparatively large threaded opening 14, of sufficient diameter to permit the insertion or removal of a bearing plate or annular seat 15, shown as having, at 16, a threaded engagement with an extension 17 of the casting 13 and as co-operating with fingers or an inwardly extending flange 18 on said extension in providing bearings for a collar or seat-lip 19, surrounding pipe 11 near the end thereof.

A gasket or gaskets 20 20' may be interposed between the collar or seat-lip 19, which may be welded to or otherwise rigidly connected with the pipe 11 and may be provided with accurately finished surfaces adapted to co-operate with like surfaces, shown as flat, upon the interior of the flange 18 and on the bearing plate 15 shown as constituting a complete ring; and the perfection of one or both of the mentioned pairs of engaging surfaces may in fact be such as to obviate the need for gaskets. A considerable clearance may be permitted between the cylindrical surfaces 21 of the flange 18 and the exterior surface 22 of the pipe 11, in order to enable the casting or angle fitting 13 to be slid into position over the upper or outer end of the said pipe (or over an elbow provided with a similar collar) and a like clearance may be permitted between the cylindrical surface 23 on the interior of the bearing plate or annulus 15 and the external surface 24 of the inwardly projecting end 25 of the pipe 11 which is surrounded thereby, but is not necessarily in engagement therewith. When, however, the outlet pipe 12 is heavy or unbalanced, an accurate fit in the region last referred to may be highly advantageous as tending to obviate undue play and consequent wear; and, in any event, the bearing plate 15 is intended to be of less diameter than a plug 26, which is normally seated in the opening 14, which must be larger than the flanged opening above mentioned; and the plate 15 is also intended to be provided with means, such as holes 27 engageable by a suitable wrench, for its insertion, adjustment, or removal, and with any preferred type of locking means, such as a screw or screws 28.

The outlet pipe 12, or its equivalent, may be connected with the main angle casting 13, or its equivalent, in any suitable way, as by the threaded connection illustrated at 29; and it will be understood that either of the mentioned pipes may in practice serve as an inlet pipe, and that either of said pipes may be rotated about the axis of that pipe which carries the bearing collar 19, or its equivalent, and also that the pipes between which relative rotation is to be permitted may meet at various angles.

Figure 3:
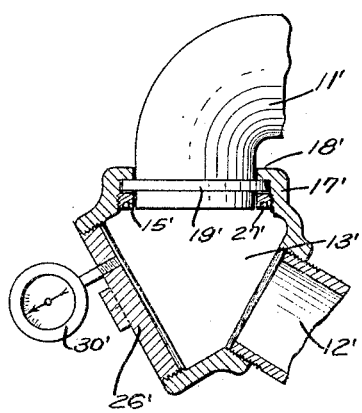
Fig. 3 is a view corresponding to Fig. 2 but showing an embodiment of my invention in which the tubular element pivotally connected met at an angle of approximately 135°.

An embodiment of my invention in which a tubular element 11' in the form of an elbow and a pipe 12' meet at an angle of approximately 135°, is separately illustrated in Fig. 3—in which figure the analogy of the mentioned parts is suggested by the use of primed numerals corresponding generally to those applied to Figs. 1 and 2. To suggest special uses of the openings into which the plugs 26 and 26' are shown as threaded, (rather than clamped) I show the plug 26 as having a smaller plug 26ª removably secured therein, to permit the optional insertion of a test cock 30; and I show the plug 26' as equipped with a pressure gauge 30'; but it will be understood that any desired alternative subsidiary equipment might be substituted for the last-mentioned devices; and a pipe providing an alternative inlet or outlet might be substituted for either of the mentioned plugs.

Although I suggest in Fig. 1 the use of my novel pivotal joint in the downward delivery of oil or the like through a valved inlet pipe 11 and a laterally movable outlet pipe 12, the latter extending at an angle from the swivel or angle casting 13, so that it is adapted to deliver alternatively into any one of a plurality of receiving funnels 31 disposed in an arc about the axis of the pipe 11, it will be understood that pivotal joints of the general character described are suitable for uses too numerous to mention; and although I have herein described and illustrated in detail but two embodiments of my invention, it will also be appreciated that various additional modifications might be devised, and that various features of my invention might be independently used, by those skilled in the art to which this case relates, without the slightest departure from the spirit and scope of my invention, as the same is indicated above and in the following claims.

I claim as my invention:

1. In an organization of the general character described, an angle fitting provided with three openings, one of these being a threaded opening for a tubular element, another being a flanged and internally threaded opening for a tubular element provided with a cooperative annular flanged collar adapted to be retained between said flange and a bearing element mounted in said threads, and the third being an opening exceeding in diameter said flanged opening, in order to permit the insertion of said bearing element therethrough, the interior of said angle fitting being an unobstructed space and said third opening being provided with an interior thread and with a plug of greater diameter than said bearing element.

2. In means for pivotally connecting tubular elements whose axes extend in different directions: an angle casting provided with an inwardly extending flange upon an outer end of said casting, said flange being engageable by a bearing collar on one of said tubular elements; a bearing plate in the form of a separate ring removably secured by threaded engagement within said casting and in engagement with said collar; and means permitting the bodily insertion or removal of said bearing plate, said bearing collar being held between parallel bearing faces provided respectively by said flange and said plate, said bearing plate being externally threaded and internally finished to interfit with a portion of a tubular element extending therethrough.

In testimony whereof, I have hereunto set my hand at Los Angeles, California, this 4th day of September, 1925.

EDWIN C. WEISGERBER.